United States Patent [19]

Pratscher

[11] Patent Number: 4,596,087
[45] Date of Patent: * Jun. 24, 1986

[54] ANIMAL TRAP

[76] Inventor: Andrew J. Pratscher, 267 Cornell, Calumet City, Ill. 60409

[*] Notice: The portion of the term of this patent subsequent to May 29, 2001 has been disclaimed.

[21] Appl. No.: 589,557

[22] Filed: Mar. 14, 1984

Related U.S. Application Data

[63] Continuation-in-part of Ser. No. 427,718, Sep. 24, 1982, Pat. No. 4,450,648.

[51] Int. Cl.⁴ ............................................. A01M 23/04
[52] U.S. Cl. ........................................... 43/64; 43/78; 43/68; 43/79
[58] Field of Search ................... 43/64, 68, 67, 70, 73, 43/74, 79, 80

[56] References Cited

U.S. PATENT DOCUMENTS

| | | | |
|---|---|---|---|
| 1,436,272 | 11/1922 | McElfresh | 43/69 |
| 2,273,008 | 2/1942 | Fisher | 43/68 |
| 4,145,834 | 3/1979 | Quigley | 43/73 |
| 4,154,016 | 5/1979 | Reyes | 43/69 |
| 4,238,903 | 12/1980 | Mazzei | 43/69 |
| 4,253,264 | 3/1981 | Souza | 43/73 |
| 4,255,891 | 3/1981 | Chen | 43/64 |

Primary Examiner—Kuang Y. Lin
Assistant Examiner—Kurt Rowan
Attorney, Agent, or Firm—Thomas W. Tolpin

[57] ABSTRACT

An industrial animal trap is provided to effectively, continually, and rapidly exterminate rodents, pigeons, and other animal pests in an efficient and safe manner. The animal trap has a feeding chamber, a killing chamber, and an optional discharge chamber, which are separated by moveable walls. In the preferred form, the chambers are in horizontal alignment and the animal trap has a horizontally moveable front wall which sequentially pushes the animal from the feeding chamber to the killing and discharge chambers.

20 Claims, 9 Drawing Figures

ANIMAL TRAP

CROSS REFERENCES TO RELATED APPLICATIONS

This application is a continuation-in-part of application Ser. No. 427,718, filed Sept. 24, 1982, now U.S. Pat. No. 4,450,648, issued May 29, 1984, for an Industrial Rodent Killing Device, classified in Group Art Unit 325, before Examiner K. Rowan.

BACKGROUND OF THE INVENTION

This invention pertains to industrial animal traps, and more particularly, to devices for killing rodents and other pesty animals.

In the farming, harvesting, and storing of food grains, it has been estimated that as much as 30% of the food products are lost to rodents (rats, mice, etc.) whether the food be in the field, in a silo, or in transportation. The world-wide loss due to rodent consumption has been estimated to run into billions of dollars.

In the past, control of rodent and other animal pests have been usually confined to chemical pesticides. Chemical pesticides, however, are not usually effective to efficiently eliminate and dispose of large numbers of rodents without contaminating or otherwise adversely effecting the soil, atmosphere, and other areas of the environment.

Spring-loaded animal traps and other mechanical devices for entrapping and killing rodents and other animal pests have been known for centuries. Typifying these traps are those shown in U.S. Pat. Nos. 114,062; 214,013; 363,554; 813,333; 829,960; 857,879; 1,002,082; 1,120,114; 1,436,272; 2,061,123; 2,273,008; 2,531,568; 4,145,834;. 4,154,016; 4,238,903; 4,253,264; and 4,255,891 and German Pat. No. 532,206. These traps have met with varying degrees of success.

Many of these prior art traps, however, suffer from the disadvantage that large numbers of rodents cannot be killed since the traps must be manually reset after each kill. Furthermore, many of these traps attract and impail or otherwise kill rodents in the same compartment and leave blood and other remains of the dead animal in the feeding area which repels other animals from entering the trap.

It is therefore desirable to provide an improved animal trap which overcomes most, if not all, of the above problems.

SUMMARY OF THE INVENTION

An improved animal trap is provided which effectively destroys vast numbers of rodents (rats, mice, etc.), pigeons, crows, and other animal pest in a safe manner. Desirably, the novel animal trap can automatically and efficiently kill thousands of rats or other pesty animals with little or no maintenance and repair.

The animal trap is quick, virtually bloodless, and economical. It can eliminate rodents and many other types of undesirable animals without dangerous and hazardous chemical pesticides.

It can be pneumatically, mechanically, or magnetically operated or powered by solar energy or electricity, if desired. The trap can be activated by a photoelectric switch or by a magnetic, pressure-sensitive, or heat-sensitive switch or by other triggering means. The sequence of operation of the trap can be controlled by a pneumatic logic board, electromagnetic relays, electric circuitboards or chips, and/or mechanical timing mechanisms, such as cams, toggles, geneva wheels, gears, etc.

Desirably, the animal trap has a separate feeding chamber and killing chamber so that any remains of the animal in the killing chamber will not discourage other animals from entering the feeding chamber. The animals are attracted into the feeding chamber by bait placed in the chamber or by the odor, scent, and aroma of bait from an adjacent bait source which can permeate and pass into the feeding chamber through a screen, conduit, or other openings.

After the animal enters the feeding chamber, the activating switch (photoelectric switch, etc.) is tripped to quickly close the entrance door or access opening. The wall or panel separating the feeding chamber and killing chamber is opened and a power driven piston or plunger forming one of the other walls of the feeding chamber pushes the animal into the killing chamber. In the killing chamber, the animal is impaled or otherwise killed. In the preferred form, retractable power-driven spikes enter the killing chamber to quickly and virtually bloodlessly kill the animal. Alternative ways of killing the animal in the killing chamber can also be employed, such as by crushing (compressing) the animal against a wall of the killing chamber with the piston or plunger, or by decapitation (guilloteening), by poison gases or fluids, electrocution, lethal injections, drowning, etc.

After the animal has been killed, the killing device is retracted or purged. A wall or panel of the killing chamber is opened and the piston or plunger pushes the dead animal into a discharge chamber or holding receptacle for eventual disposal. Thereafter, the piston or plunger is retracted into its initial starting position in the feeding chamber, the walls of the feeding chamber are closed, and the entrance to the feeding chamber is opened to reset the trap.

In the preferred embodiment, the feeding and killing chambers (compartments) are in side-by-side or end-to-end horizontal alignment and/or lateral registration with each other for mechanical simplicity, stability, and best results. Such construction is more attractive to many animals who are too lazy to walk up a ramp or otherwise climb up to the top chamber of a vertical trap. It also substantially reduces the overall height of the trap which is useful in places with limited height requirements. The discharge chamber or other chambers of the trap can be at a slight incline or pitch, if desired.

A more detailed explanation of the invention is provided in the following description and appended claims taken in conjunction with the accompanying drawings.

DETAILED DESCRIPTION OF THE PREFERRED EMBODIMENTS

Referring now to FIGS. 1–5 of the drawings, a vertical animal trap 10 provides an industrial animal killing device for killing rodents (rats, mice, etc.), pigeons, crows, and other animals. While the animal trap is described with particular reference to rodents, it is to be understood that the animal trap can also be used for trapping, killing, and disposing of other animals.

Figure 1:
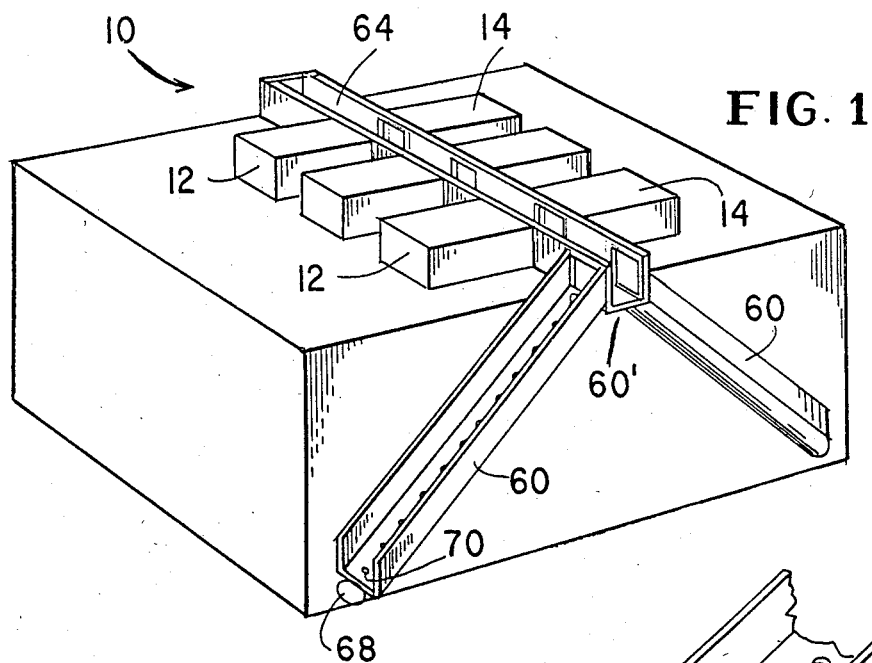
FIG. 1 is a perspective view of a vertical animal trap in accordance with principles of the present invention.
Figure 2:
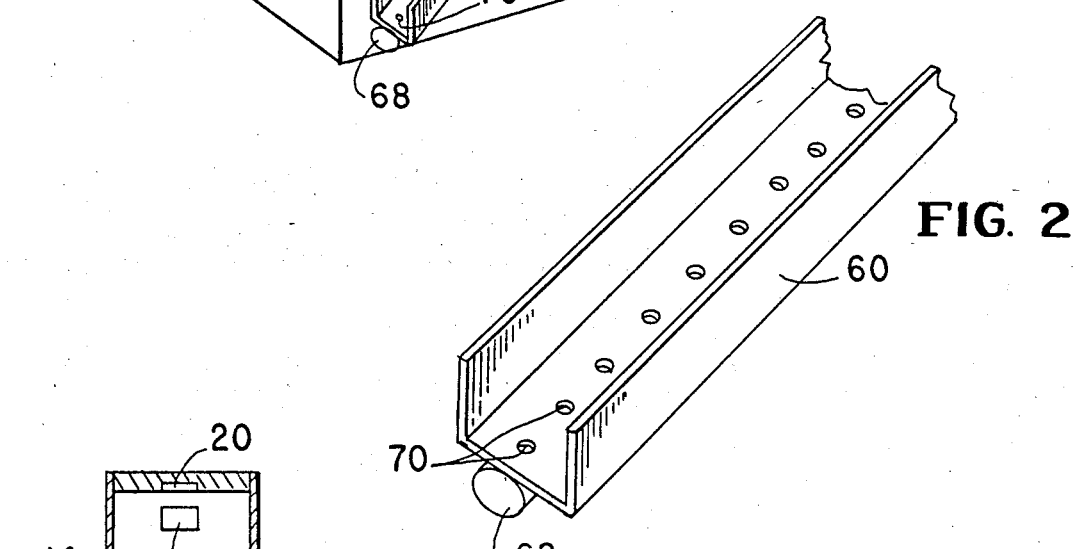
FIG. 2 is a perspective view of part of the inclined ramp and scent-carrying bait-conduit leading up to the top of the vertical animal trap.
Figure 3:
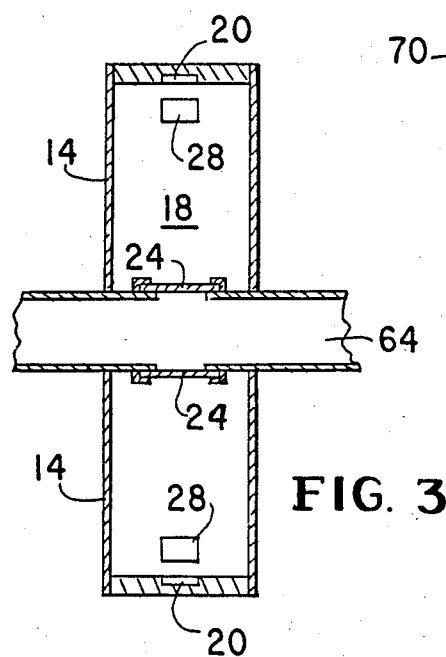
FIG. 3 is a fragmentary cross-sectional view of the top of the vertical animal trap.

As shown in FIG. 1, a plurality of rodent feeding and killing units 12 are provided on a receptacle or container, so that many rodents can be exterminated at the same time. Each unit 12 is made up of an upper feeding chamber 14 (FIGS. 4 and 5) and a lower killing chamber 16 directly below the feeding chamber, so that the floor 18 of the upper feeding chamber also forms the ceiling of the lower killing chamber.

The upper feeding chamber, which is preferably cubical in configuration, though other shapes can be used, is provided with bait, which will lure a rodent into the interior of the chamber. Such bait is typically peanut butter or a mixture of peanut butter and grain, such as oat or wheat. The bait is situated in a cavity 20 of the end wall 14' of the upper chamber 14, which cavity is covered by a screen mesh, so that the aroma from the food is allowed to permeate its surroundings, yet prevent the rodent from actually eating it, so that the same bait may be used a number of times to attract a rodent. The screen mesh which covers the cavity in the end wall 14' lies flush with the inner surface of the wall, so that the ceiling 22 of the upper chamber may be lowered toward the floor 18, which operation is described below.

The animal trap has a trap door 24 (FIG. 3) that is normally in a raised, open position to allow entry of a rodent into the interior of the upper feeding chamber. A pressure sensitive pad or activating switch 28 is provided on the floor 18 of the upper chamber. Upon a rodent's treading upon the pressure sensitive pad, a circuit is closed that activites a normally closed solenoid switch, which in turn activates an air cylinder to speedily lower the door 24 into its lower, closed position, to seal the rodent in the upper chamber. When the trap door is lowered into its closed position, the ceiling 22 of the upper feeding chamber is lowered vertically and the floor 18 is moved horizontally sideways, so that as the floor is slid out from uhder the rodent, the rodent is forced to fall into the lower killing chamber 16. Since some rodents are of larger size than others, the possibility exists that a portion of the rodent, such as its head, may extend above the plane of the floor 18 when the rodent is entrapped in the lower killing chamber. In order to assure that the entire rodent is within the confines of the killing chamber, the ceiling 22 is lowered downwardly until it reaches near the plane of the floor 18. Upon reaching this location, the floor is again reciprocated back to its original closed position, thereby completing the entrapment of the rodent in the lower killing chamber.

Air cylinders reciprocate the ceiling and floor along channeled pathways or rails in response to the operation of a solenoid switch. The exact timing sequence can be readily achieved with conventional sensing switches located near the end point of travel of the ceiling, floor, and trap door.

Once the trapped rodent is located in the killing chamber 16, it can be destroyed effectively without having any of its remains positioned within the upper feeding chamber, which would deter other rodents from entering the upper feeding chamber, since other rodents sould sense death through their sense of smell that it is a trap and would also in time overpower the smell of the bait. The bait does not interfere with the movement of the ceiling as it descends toward the lower killing chamber since it is enclosed in a cavity of the end wall 14'.

Once the rodent is positioned in the lower killing chamber, a set of spikes 30 are forcibly protruded into the interior of the killing chamber to impale the rodent and destroy it. The spikes are mounted to a mounting plate which is affixed to a piston 34 operated by an air cylinder. The side wall 16' (FIG. 4) of the killing chamber is provided with a plurality of passageways 36 through which the ends of the spikes project to kill a rodent. The shank portions of the spikes are inserted through openings 38 in a guide wall 40. The openings are in alignment with and slightly larger than the spike passageways so that each spike, when in its extended operating position, will extend through a respective passageway and opening. The guide wall 40 is spaced from the side wall 16', as shown in FIG. 4, so that when the spikes are retracted after impaling a rodent, any residue from the remains of the rodent will fall down the gap between the guide wall and the side wall.

After the rodent has been impaled in the killing chamber, it must be disposed of, which is achieved by pivotally mounting the floor 44 of the killing chamber. The floor and side wall 16' rotate as a unit in the counterclockwise direction, while the upper portion of the side wall enters the interior of the killing chamber and forces the killed rodent downwardly through the space vacated by the floor. After the rodent is disposed in a receptacle container, the unit is rotated in the clockwise direction to its original position as shown in FIG. 4. The unit can be rotated by any conventional means, such as a swivel mounted piston-cylinder arrangement.

Figure 4:
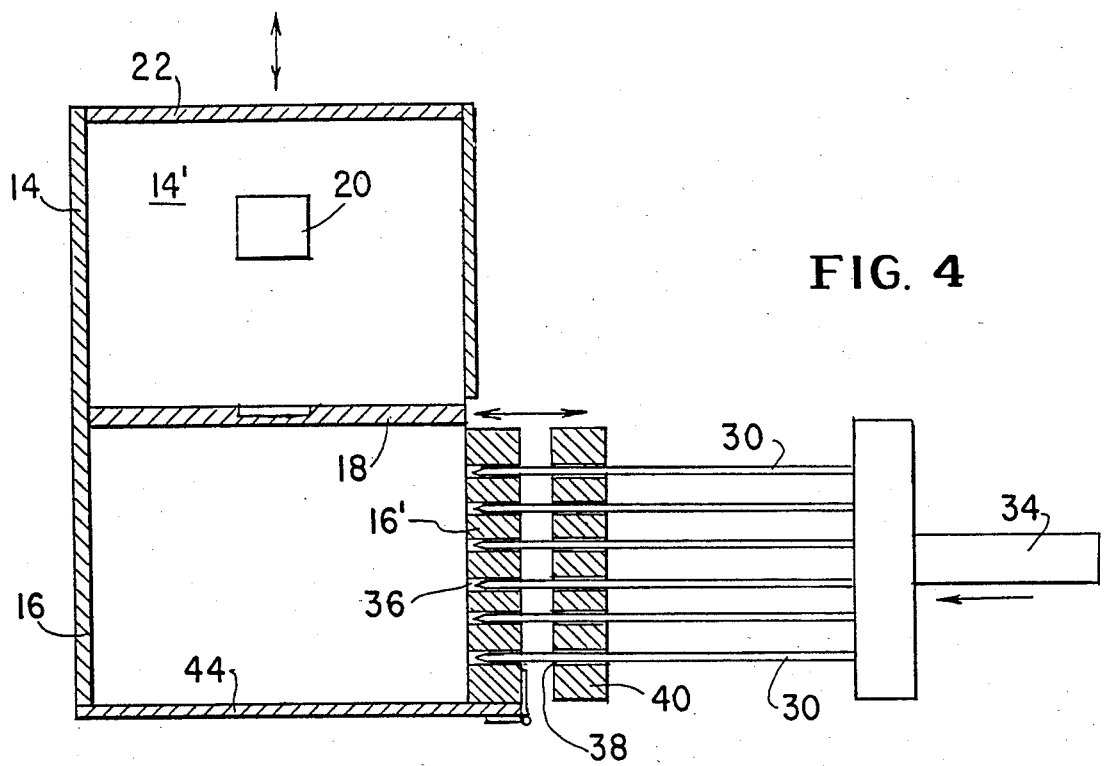
FIG. 4 is a cross-sectional view of the side of the vertical animal trap when the trap is open.
Figure 5:
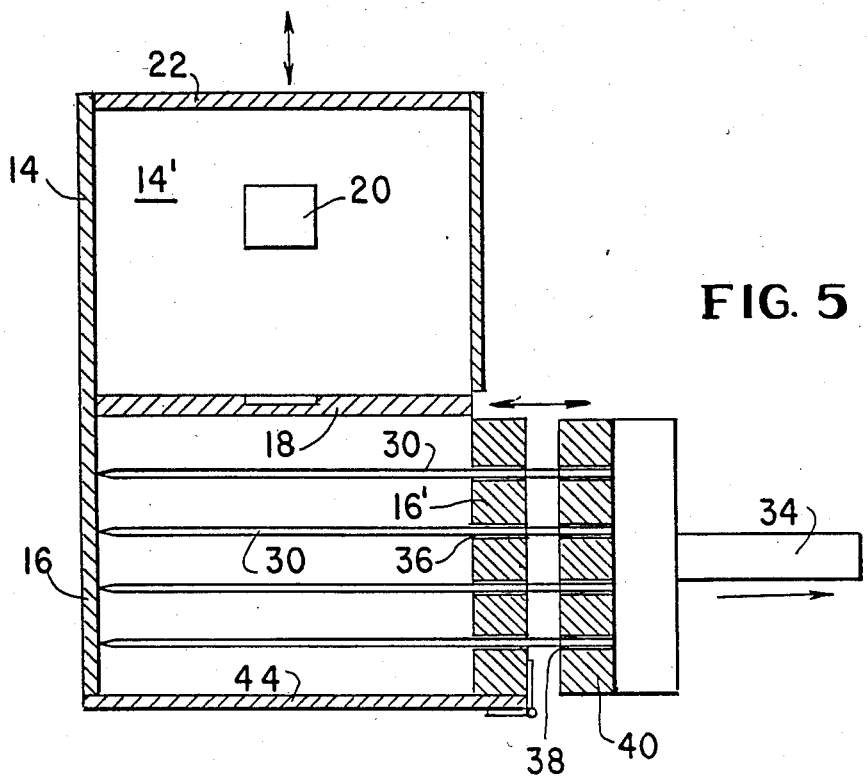
FIG. 5 is a cross-sectional view of the side of the vertical animal trap during the killing sequence when the trap is closed.

As the side wall 16' is rotated in the counterclockwise direction as viewed in FIG. 4, the passageways 36 will tend to move to a vertical incline, which will aid in the removal of any material stuck therein from the ends of the spikes. Such removal is accomplished by gravity and by the reaction to the thrust created upon the return of the side wall to its original position when rotated in the clockwise direction. Such removal is advantageous to prevent foul smelling odors from occurring in the killing chamber, which may permeate to the outside via the floor or other avenues of escape and could warn other rodents that a trap is present.

In an alternative form, the floor 44 may be reciprocated in the horizontal direction to deposit the killed rodent into the receptacle. In this alternative, the side wall 16' is fixed and the floor is reciprocated by an air cylinder via grooved channels in the bottom surface of the side wall 16'.

The upper feeding chamber of the animal trap can be located above the container (receptacle), while the lower killing chamber can be located below the top of the container. More units 12 than that shown in FIG. 1 may be provided in a similar manner.

To allow a rodent to get to the feeding chamber and enter through the opening formed by the trap door 24, conduits 60 (FIGS. 1 and 2) are provided. The conduits are preferably U-shaped channel members which at their top end communicate with a walkway 64. The conduits guide the rodent past a series of open feeding chambers.

To first attract a rodent to enter the conduit, each U-shaped channel member is provided with a closed end pipe or conduit 68 that has a series of holes 70 formed in its surface. The pipe holes communicate with a series of holes in the conduits 60. Each end of the pipe is connected to a common pipe that has one of its ends affixed to a side wall so that they are in fluid communication with the interior of the feeding chamber. The aroma from the bait stored in the feeding chamber is passed along the pipes to the conduit trail. A rodent entering the bottom of any conduit will immediately smell the aroma from the food stored in the feeding chamber and will be led along the conduit into the feeding chamber by the same smell.

In use, the sequence of operation is as follows. A rodent will travel up a conduit, attracted by the pleasant aroma of the bait, until it enters the feeding chamber via the open door. When the rodent tries to locate the bait and eat it, it will depress the pressure sensitive pad and thereby close the circuit to the solenoid switch operating the air cylinder of the door. Closing of the circuit, causes the door to close swiftly, as well as causes the ceiling of the feeding chamber to descend and the floor of the feeding chamber to be moved horizontally outwardly so that the rodent will fall into the killing chamber below. Next, the sliding floor of the feeding chamber will return to its normally closed position and the ceiling will be raised to its normal height. Upon entry of the rodent into the killing chamber, the spikes will be activated to impale the rodent and kill it, and then the rotating unit of the floor and side wall of the killing chamber will be rotated counterclockwise to dispose of the rodent into the receptacle below. Simultaneously with the rotation of the unit, the spikes are withdrawn to their original retracted position. Suitable relay switches are provided to control the sequence of operation, which switches can be of conventional design. After a sufficient time has elapsed, for example two days, the receptacle's container is emptied of its contents and new supplies of bait are provided.

The air cylinders used to control the movement of the feeding chamber door, floor, and ceiling, and the rotation of the killing chamber floor and side wall, is preferably a spring-return solenoid-controlled air cylinder with a bore of 1 1/8 inches and a stroke of 4 inches, such as provided by Model SRS manufactured by Carter Controls, Inc. of Lansing, Ill. To operate the spikes, an air cylinder having a 3 inch bore and a 4 inch stroke is preferably used, which will provide a force of about 700 pounds for an air pressure of 100 psi, such as an air cylinder provided by Carter Controls, Inc.

The horizontal animal trap 100 shown in FIGS. 6–9 is similar in many respects to the vertical animal trap shown in FIGS. 1–5, except that the rectangular-shaped feeding, killing, and discharge (receptacle) chambers or compartments 102, 104, and 106 are in side-by-side or end-to-end horizontal and lateral alignment, communication, and registration with each other so that the rodent or other animal does not need to walk up a ramp or otherwise climb up the trap before entering the access opening 108 of the feeding chamber. It has been found that the horizontal animal trap is even more efficient and effective in killing rodents and other animals than the vertical trap.

While the horizontal animal trap is described with particular reference to eliminating rodents (rats, mice, etc.), it is to be understood that the horizontal animal trap is also useful in attracting, trapping, killing, and disposing of pigeons, crows, rabbits, raccoons, and other animals. Furthermore, while the ceiling, floor, and vertical walls of the chambers are preferably stationary or fixed, except as described below, one or more of the ceiling, floor, or walls can be made to slide, reciprocate, pivot, or otherwise move, if desired.

In the preferred embodiment, the feeding, killing, and discharge chambers have a common, horizontal, coplanar, stationary ceiling 110 and a common, horizontal, coplanar, stationary floor 112. The ceiling of the killing chamber has openings 114 for receiving a set of retractable vertical spikes 116 which are mounted on a crossbar or piston 118 driven by one or more pneumatic cylinders 120 and rods 122. The floor or side of the feeding chamber can have bait holes or passageways 124 through which the fragance, scent, and aroma of the bait from a slidably removable, U-shaped bait tray can pass. If desired, laterally or transversely moveable spikes can be used instead of the vertical spikes.

A vertical piston, ram, or plunger provides a moveable, vertical, front drive wall 126 which is reciprocatingly driven in the horizontal direction by one or more horizontal pneumatic cylinders 128 and rods 129. The power driven front wall provides the front or end of the feeding chamber when the trap and access opening are open. Movement of the front wall can be controlled by a timing mechanism, such as a cam 130 and cam follower 131. Cables and other timing mechanisms can also be used. The front wall can have downwardly extending wheels 132 or bearings to slide and roll upon the floor or rails or tracks mounted on the floor. The cylinders are connected to a suitable power source (not shown), such as a compressor or air tank controlled by one or more valves and pneumatic logic boards or limit switches. Other power sources, such as batteries, generators, motors, engines, pumps, or solor energy collectors, can be used with other types of cylinders, such as solenoid-activated electromagnetic cylinders, hydraulic cylinders, etc.

An intermediate common vertical wall or panel 133 extends between and separates the feeding chamber from the killing chamber. A common vertical end wall 134 separates the killing chamber from the discharge or disposal chamber. The overhead cylinder or other cylinders drive the intermediate and end walls upwardly to open positions substantially out of the chamber and downwardly to normally closed positions. If desired, the intermediate and end walls can move sideways (transversely) to an open position rather than upwardly.

Figure 6:
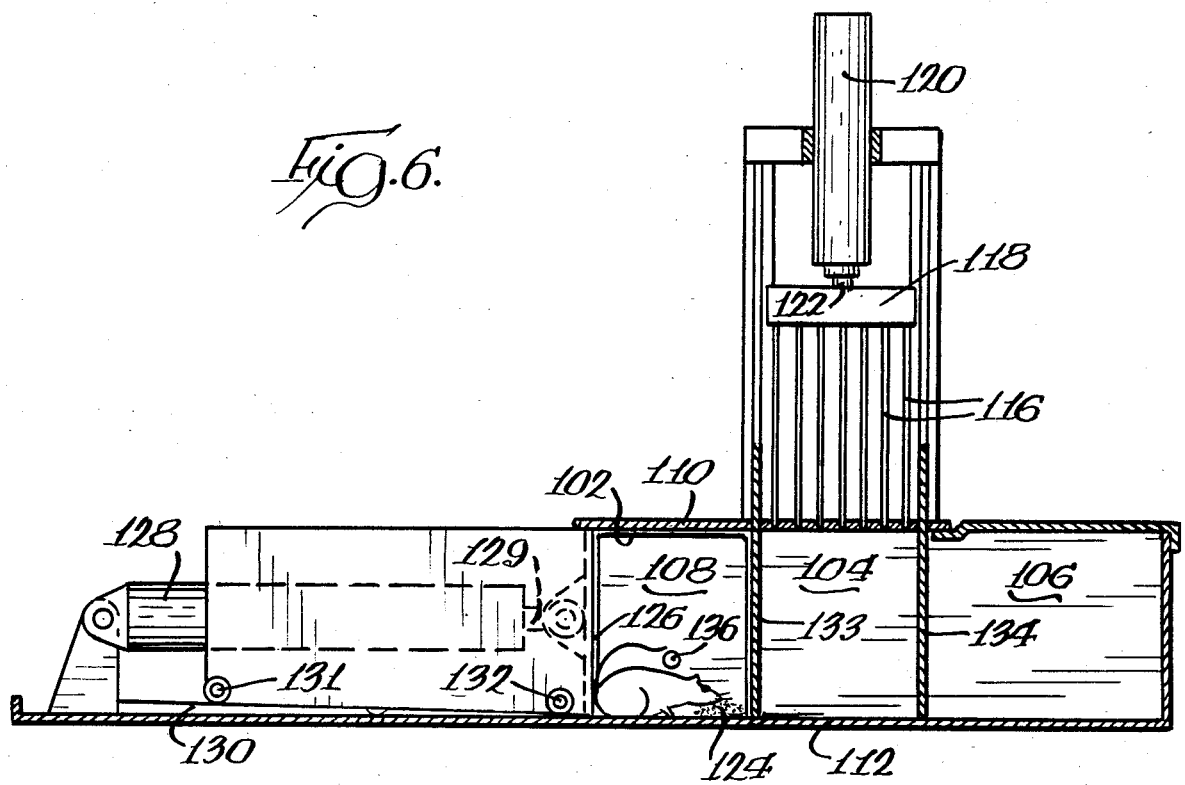
FIG. 6 is a cross-sectional view of a horizontal animal trap in accordance with principles of the present invention with an animal in the feeding chamber.

In operation, the rodent enters the opening of the feeding chamber as shown in FIG. 6. An activating sensor or switch 136, such as a magnetic switch, senses the presence of the rodent when the rodent interrupts the magnetic field in the feeding chamber and the trap by activating the power source and associated pneumatic or electric circuitry or limit switches. Other sensors or switches can be used, such as photoelectric switches, pressure sensitive switches, heat sensitive switches, etc.

Figure 7:
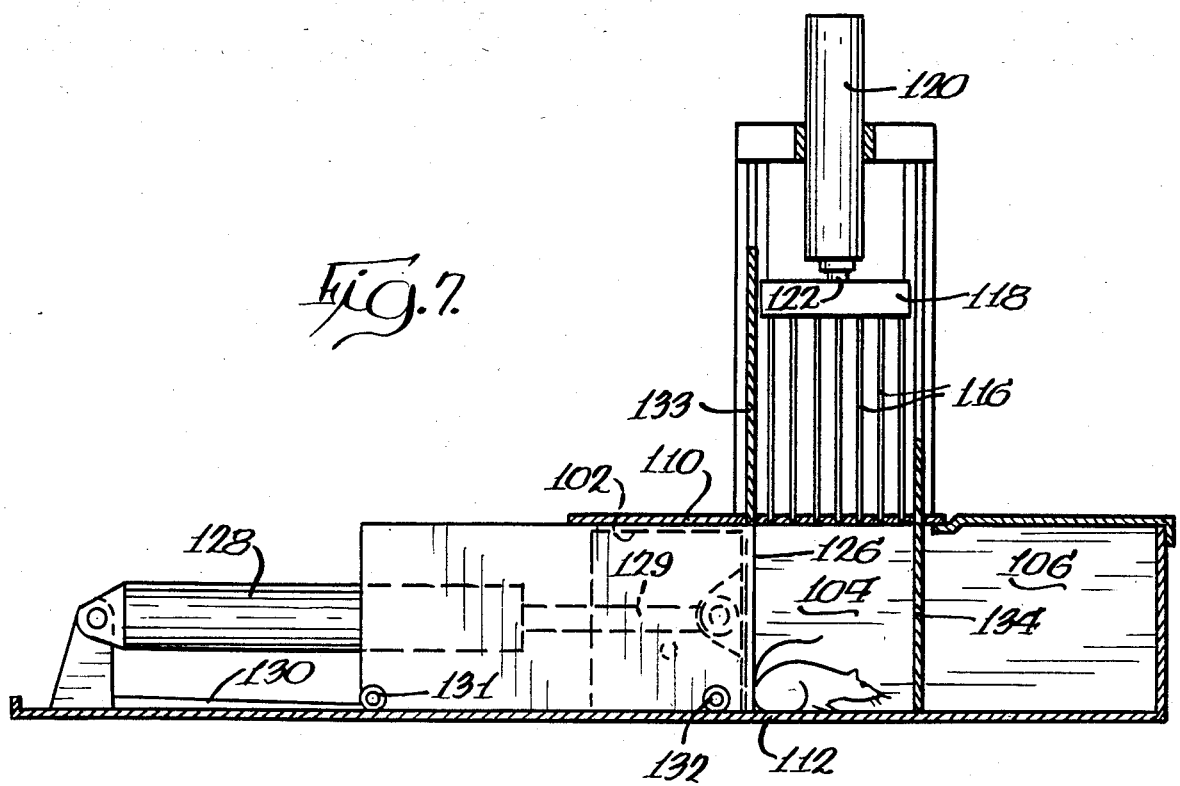
FIG. 7 is a cross-sectional view of the horizontal animal trap after the animal has been pushed into the killing chamber.

After the circuit is tripped (activated), the intermediate wall 133 is lifted to its open position and the front drive wall 126 pushes the rodent into the killing chamber by moving to the intermediate position separating the killing chamber and the feeding chamber (the former, normally closed position of the intermediate wall) as shown in FIG. 7. The vertical side flange 136 which extends laterally along the side of the front wall provides a slidable door that closes the access opening to the feeding chamber when the front wall moves rearwardly to the intermediate position.

Figure 8:
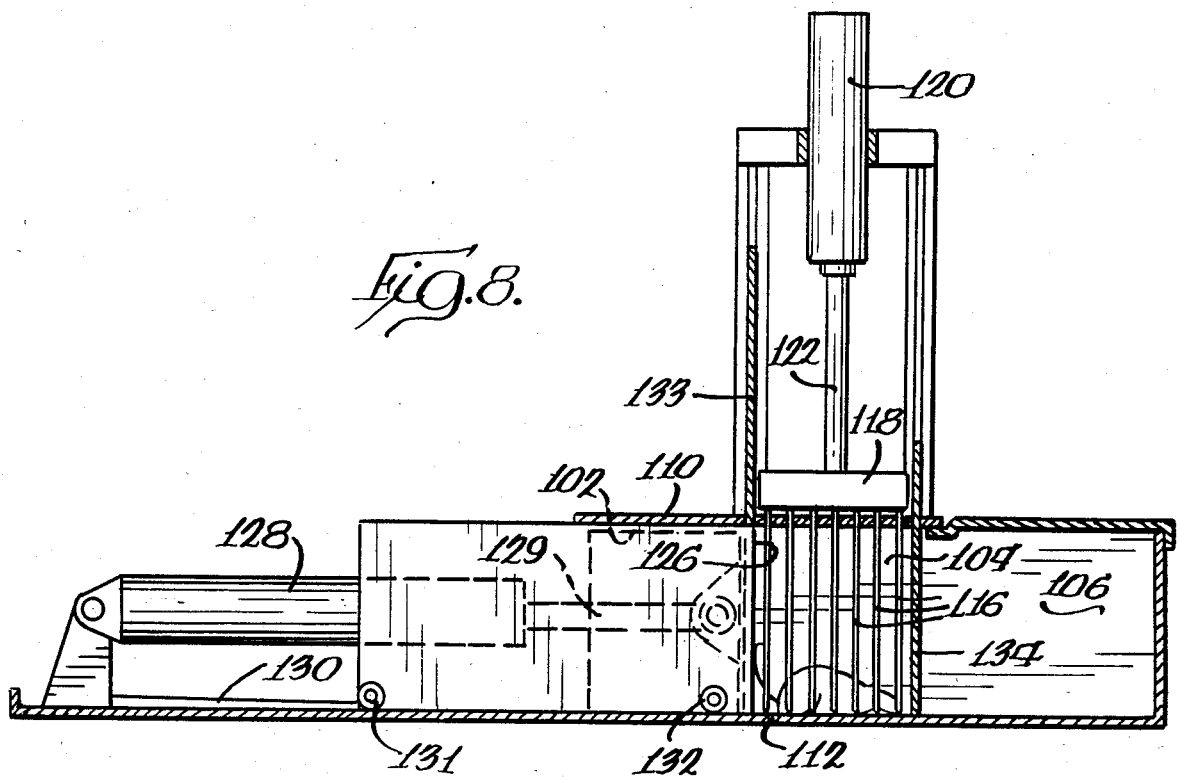
FIG. 8 is a cross-sectional view of the horizontal animal trap during the killing sequence.

In the killing chamber, the spikes 116 are quickly driven into the rodent to kill the rodent as shown in FIG. 8 and rapidly retracts out of the killing chamber. Such action has been found to be virtually bloodless.

Figure 9:
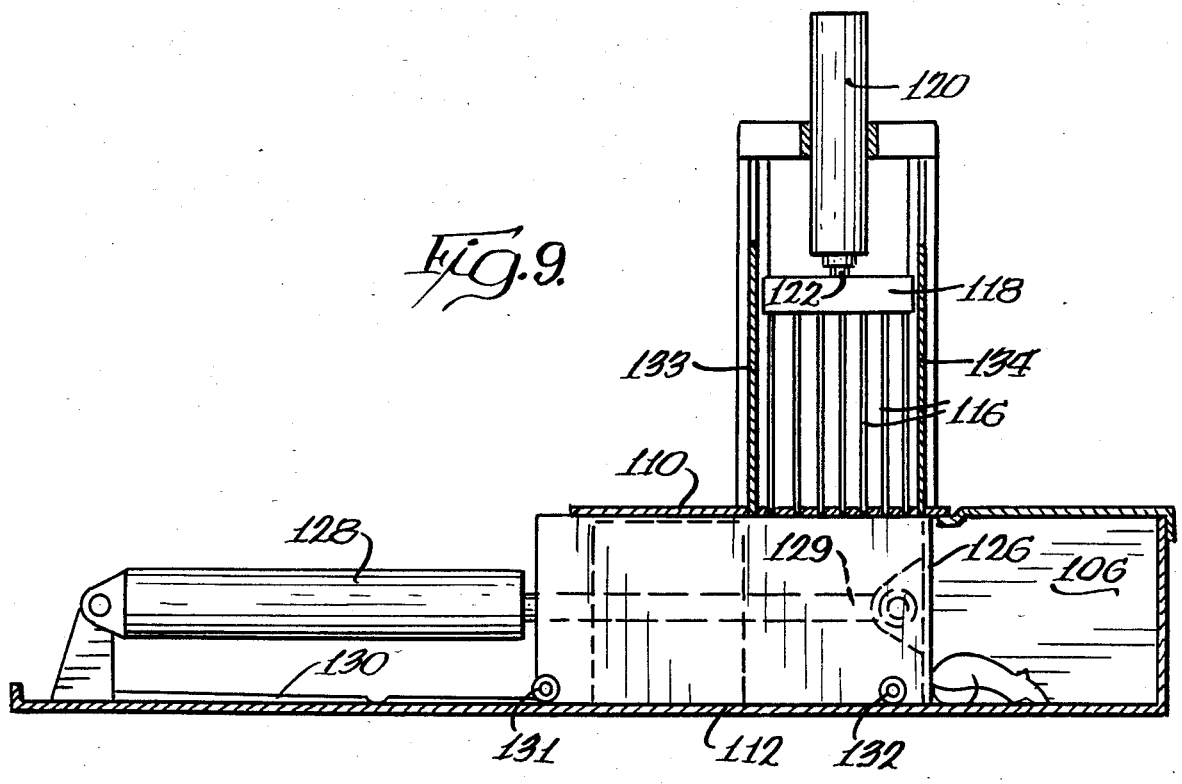
FIG. 9 is a cross-sectional view of the animal trap showing the animal being pushed into a discharge chamber or receptacle.

Thereafter, the end wall 134 is lifted to its open position and the front drive wall pushes the dead rodent into the discharge chamber by moving to its rearward position separating the discharge chamber and the killing chamber (the former, normally closed position of the end wall), as shown in FIG. 9. This completes the end of the cycle and the front, intermediate, and end walls are returned to their normally closed or starting positions as shown in FIG. 6. The discharge chamber is periodically emptied as desired.

Although embodiments of the invention have been shown and described, it is to be understood that various modifications and substitutions, as well as rearrangements of parts, can be made by those skilled in the art without departing from the novel spirit and scope of this invention.

What is claimed is:

1. An animal trap, comprising:
   a feeding compartment for attracting an animal with the aroma of bait, said feeding compartment defining an access opening for ingress of said animal into said feeding compartment;
   a killing compartment positioned in generally lateral alignment with said feeding compartment;
   killing means operatively associated with said killing compartment for killing said animal in said killing compartment;
   intermediate wall means being moveable from a normally closed position extending between and separating said feeding compartment from said killing compartment to an open position substantially out of said compartments; and
   drive wall means being moveable from one position providing the end wall of said feeding compartment when said intermediate wall means is in said normally closed position to said normally closed position of said intermediate wall means when said intermediate wall means is in said open position to move said animal into said killing compartment.

2. An animal trap in accordance with claim 1 including cylinder means for driving said wall means.

3. An animal trap in accordance with claim 1 wherein said intermediate wall means comprises a vertically moveable wall.

4. An animal trap in accordance with claim 1 wherein said intermediate wall means comprises a transversely moveable wall.

5. An animal trap in accordance with claim 1 wherein said wall means comprise pistons.

6. An animal trap in accordance with claim 1 wherein said killing means includes a set of spikes.

7. An animal trap in accordance with claim 1 including door means for closing said access opening.

8. An animal trap in accordance with claim 1 including a discharge receptacle.

9. An animal trap in accordance with claim 1 wherein said compartments are in an end-to-end array.

10. An animal trap in accordance with claim 1 wherein said compartments comprise side-by-side compartments.

11. An animal trap, comprising:
    a feeding chamber defining an access opening for entrance of an animal and bait passageways for passage of scent of a bait to attract the animal into the feeding chamber;
    a killing chamber communicating and positioned in substantial horizontal alignment and registration with said feeding chamber;
    a discharge chamber communicating and positioned in substantial horizontal alignment and registration with said killing chamber for discharging animals killed in said killing chamber;
    said feeding, killing, and discharge chambers having a common, substantially coplanar horizontal ceiling and a common, substantially coplanar horizontal floor;
    an intermediate vertically moveable, power-driven vertical wall being moveable from a normally closed position extending between and separating said feeding and killing chambers to an upward open position generally outside of said chambers;
    a vertically moveable, power-driven, vertical end wall being moveable from a normally closed position extending between and separating said killing and discharge chambers to an upward open position generally outside of said chambers;
    a power-driven front vertical wall being horizontally moveable from an initial position providing a front wall for said feeding chamber when said intermediate wall is in said normally closed position, to an intermediate position occupying the normally closed position of said intermediate wall when said intermediate wall is raised in said open position to push said animal into said killing chamber, to an end position occupying the normally closed position of said end wall when said end wall is raised in said open position to push the killed animal into said discharge chamber; and
    a set of vertical, power-driven spikes for entering into said killing chamber when said front wall is in said intermediate position to impale said animal.

12. An animal trap in accordance with claim 11 wherein said front wall comprises a ram.

13. An animal trap in accordance with claim 12 wherein said front wall includes a lateral upright flange for closing said access opening when the animal enters said feeding chamber.

14. An animal trap in accordance with claim 13 including power means comprising a generally horizontal cylinder and rod for driving said front wall.

15. An animal trap in accordance with claim 14 wherein said power means comprises a pneumatic cylinder.

16. An animal trap in accordance with claim 13 including timing means for sequentially moving said front wall from said initial position to said intermediate and end positions.

17. An animal trap in accordance with claim 16 wherein said timing means includes a cam.

18. An animal trap in accordance with claim 11 wherein said floor has a track and said front wall has wheels for riding upon said track.

19. An animal trap in accordance with claim 11 including a piston providing a crossbar for holding said spikes and power means including an overhead vertical cylinder for reciprocatingly and vertically driving said spikes into said killing chamber.

20. An animal trap in accordance with claim 19 wherein said power means includes a pneumatic cylinder.

* * * * *